US012809040B2

(12) United States Patent
Nguyen et al.

(10) Patent No.: US 12,809,040 B2
(45) Date of Patent: Nov. 24, 2026

(54) NAVIGATION AND POSITIONING DEVICE AND METHOD

(71) Applicant: THALES, Meudon (FR)

(72) Inventors: Emmanuel Nguyen, Valence (FR); Vincent Chopard, Valence (FR); Thomas Lesage, Chatellerault (FR)

(73) Assignee: THALES, Meudon (FR)

( * ) Notice: Subject to any disclaimer, the term of this patent is extended or adjusted under 35 U.S.C. 154(b) by 137 days.

(21) Appl. No.: 18/879,239

(22) PCT Filed: Jul. 3, 2023

(86) PCT No.: PCT/EP2023/068219
§ 371 (c)(1),
(2) Date: Dec. 26, 2024

(87) PCT Pub. No.: WO2024/008640
PCT Pub. Date: Jan. 11, 2024

(65) Prior Publication Data

US 2025/0389853 A1 Dec. 25, 2025

(30) Foreign Application Priority Data

Jul. 4, 2022 (FR) ....................................... 2206754

(51) Int. Cl.
*G01S 19/49* (2010.01)
*G01S 19/39* (2010.01)

(52) U.S. Cl.
CPC ............ *G01S 19/49* (2013.01); *G01S 19/393* (2019.08)

(58) Field of Classification Search
CPC ........ G01S 19/14; G01S 19/20; G01S 19/393; G01S 19/47; G01S 19/49
See application file for complete search history.

(56) References Cited

U.S. PATENT DOCUMENTS 6,317,688 B1 11/2001 Bruckner et al.
2009/0276155 A1 11/2009 Jeerage et al.
2021/0394790 A1* 12/2021 Lee .................. B60W 50/0205

FOREIGN PATENT DOCUMENTS

FR 3026195 A1 3/2016

OTHER PUBLICATIONS

FR 2206754, INPI Rapport de Recherche Preliminaire, Mar. 17, 2023, 2 pages.
PCT/EP2023/068219, International Search Report, Sep. 29, 2023, 2 pages.

* cited by examiner

*Primary Examiner* — Timothy A Brainard
(74) *Attorney, Agent, or Firm* — Soquel Group LLC

(57) ABSTRACT

A navigation and positioning device including an inertial measurement unit, a receiver for receiving GNSS satellite positioning measurements, a closed-loop primary Kalman filter configured to compute navigation data corrections by hybridizing satellite data and non-satellite data, as well as a bank of N closed-loop secondary Kalman filters, each configured to compute navigation data corrections based solely on the non-satellite positioning data delivered at least by the inertial measurement unit, each secondary Kalman filter of index i, where $1 \leq i \leq N$, being able to reconfigure itself to the primary Kalman filter at a time $(i-1)^T$ from the start of navigation of the vehicle, and then periodically at a period N×T, T being a predetermined duration.

8 Claims, 4 Drawing Sheets

NAVIGATION AND POSITIONING DEVICE AND METHOD

CROSS-REFERENCE TO RELATED APPLICATIONS

This application claims benefit under 35 USC § 371 of PCT Application No. PCT/EP2023/068219 entitled NAVIGATION AND POSITIONING DEVICE AND METHOD, filed on Jul. 3, 2023 by inventors Emmanuel Nguven, Vincent Chopard, and Thomas Lesage. PCT Application No. PCT/EP2023/0682149 claims priority of French Patent Application No. 22 06754, filed on Jul. 4, 2022.

FIELD OF THE INVENTION

The present invention relates to a navigation and positioning device suitable for being carried on board a vehicle suitable for moving between two distinct geographical positions, the device comprising at least: an inertial measurement unit suitable for providing navigation measurements, a receiver for GNSS satellite positioning measurements, a closed-loop primary Kalman filter configured to compute corrections of navigation data by hybridization of satellite positioning data provided by said receiver and of non-satellite positioning data provided by at least said inertial measurement unit, said corrections being applied again by loop-back at the input of said primary Kalman filter.

The invention further relates to a vehicle comprising such a navigation and positioning device.

The invention further relates to a navigation and positioning method implemented by such a navigation and positioning device.

The invention further relates to a computer program comprising software instructions which, when executed by a computer, implement such a navigation and positioning method.

The present invention relates to the navigation of a vehicle apt to move between two distinct geographical positions, such as a land vehicle, an aircraft, or preferentially a naval vehicle such as a ship or else a naval vessel.

BACKGROUND OF THE INVENTION

Currently, it is possible to determine the geographical position of such a vehicle using a GNSS (Global Navigation Satellite System). To this end, the vehicle generally carries a satellite navigation and positioning system receiver configured to determine, in particular by trilateration, a positioning (i.e. a geolocation position or a geolocation solution) of the aircraft using estimates of distances to visible satellites of the same or of a plurality of constellations of satellites of the satellite navigation and positioning system. Examples of satellite navigation systems are the American GPS system, the European GALILEO system, the Russian GLONASS system, the Chinese BEIDOU system, etc.

In addition, vehicles also have other navigation systems such as one or a plurality of inertial measurement units INS (Inertial Navigation System), baro-altimeters, anemometers, etc. An inertial measurement unit consists of a set of inertial sensors (accelerometers, gyrometers) associated with electronic processing systems, and provides information with little noise and accurate over the short term, but the performance thereof deteriorates over the long term, in particular because of the sensors that compose same.

Such vehicles then use, for predetermined applications, a hybridization technique for position measurements known as INS/GNSS hybridization, apt to provide vehicle location with an accuracy on the same order of magnitude as GNSS location and very precise attitude and heading angles, while ensuring continuity of service when GNSS is unavailable.

However, INS/GNSS hybridization implemented using current techniques is not optimal to protect against GNSS errors in the event of satellite failure, GNSS software or hardware failure, or intentional or unintentional interference, nor to provide integrated positioning when such errors occur.

SUMMARY OF THE DESCRIPTION

The goal of the invention is then to propose a navigation and positioning device which at least makes it possible to maintain the integrity of the positioning independently of the vulnerability of the GNSS measurements.

To this end, the invention provides a navigation and positioning device suitable for being carried on board a vehicle suitable for moving between two distinct geographical positions, the device comprising at least:

- an inertial measurement unit suitable for providing navigational measurements,
- a receiver for receiving GNSS satellite positioning measurements,
- a closed-loop primary Kalman filter configured to compute navigation data corrections by hybridizing satellite positioning data provided by said receiver and non-satellite positioning data provided by at least said inertial measurement unit, the device further comprising a bank of N closed-loop secondary Kalman filters with N a predetermined integer such that $N \geq 1$, each secondary Kalman filter being configured to compute navigation data corrections solely from the non-satellite positioning data provided by at least said inertial measurement unit, each secondary Kalman filter of indexi, where $1 \leq i \leq N$, being able to reconfigure itself on the primary Kalman filter at a time $(i-1)^T$ from the start of navigation of the vehicle, and then periodically at a period $N \times T$, T being a predetermined duration, the N secondary Kalman filters being identical and independent, the period $N \times T$ corresponding to a verification period of the integrity of the said GNSS satellite positioning measurements, the device being further configured to:

- check, at each instant n+1, the integrity of said GNSS satellite positioning measurements by comparing, with a predetermined threshold, the difference between the state of each secondary filter and the state of the primary Kalman filter, and
- in case of difference greater than said predetermined threshold, raise an alarm suitable for signaling a vulnerability of said GNSS satellite positioning measurements at said instant n+1.

Thereby, the navigation and positioning device according to the present invention has a particular architecture in which the secondary Kalman filters (i.e. Kalman sub-filters) are each able to reconfigure themselves periodically, according to a period $N \times T$, on the primary Kalman filter (i.e. to copy the state vector and the covariance matrix of the primary Kalman filter into the state vector and the covariance matrix of the secondary filter), and to do so successively each in turn.

In other words, the particular architecture of the navigation and positioning device according to the present invention makes it possible to carry out a time-shifted resetting.

Moreover, none of the secondary Kalman filters use GNSS measurements as input to compute the navigation data corrections thereof, making each of the same invulnerable to a possible GNSS error.

Furthermore, the long-term degradation of the performance of secondary Kalman filters is limited. In fact, such degradation is conventionally due to a drift of the position measurements received at input and obtained only from the non-satellite measurements provided at least by said inertial measurement unit, and, according to the present invention, is limited by means of said periodic reconfiguration on the primary Kalman filter.

In other words, the period N×T makes it possible, for each secondary Kalman filter, to take advantage of the short-term precision of the position measurements, received at input, and obtained only from the non-satellite measurements provided at least by said inertial measurement unit.

According to other advantageous aspects of the invention, the navigation and positioning device comprises one or a plurality of the following features, taken individually or according to all technically possible combinations:

- the device is also configured to determine said predetermined threshold based on a probability of false alarm;
- in the event of a raising of alarm, the primary Kalman filter is also configured to reconfigure itself on a predetermined secondary Kalman filter of index p with 1≤p≤N;
- said predetermined secondary Kalman filter of index p on which the primary Kalman filter is suitable for being reconfigured in the event of a raise of alarm, is the secondary Kalman filter among said N secondary Kalman filters, the reconfiguration of which on the primary Kalman filter is the farthest, in terms of time, from the moment of raising of alarm;
- said primary Kalman filter is configured to no longer use as input said GNSS satellite positioning measurements from the moment when the primary Kalman filter initiates the reconfiguration thereof;
- in the event of a raising of alarm, each secondary Kalman filter of index i≠p is also configured to reconfigure on said predetermined secondary Kalman filter of index p;
- the device is also configured to determine a radius of protection against a vulnerability of said GNSS satellite positioning measurements, said radius of protection ensuring that the value of the distance between the hybrid position provided from said primary Kalman filter and the true position of said vehicle is less than the value of said radius of protection, said radius of protection depending on the number N of secondary Kalman filters;
- the device is also configured to provide, at the output, in parallel, navigation solutions associated with said bank of N secondary Kalman filters and with said primary Kalman filter, respectively.

A further subject matter of the invention is a vehicle comprising such a navigation and positioning device.

A further subject matter of the invention relates to a navigation and positioning method implemented by said navigation and positioning device and comprising the following steps implemented in parallel or successively one after the other or vice versa:

- locating said vehicle using the corrections provided by the primary Kalman filter and by each by the bank of N secondary Kalman filters, respectively,
- verification of the integrity of the said GNSS satellite positioning measurements, said verification comprising:
  - the determination of the status of each secondary filter and of the status of the primary Kalman filter,
  - the determination of a threshold suitable for comparison with the difference between the state of each secondary filter and the state of the primary Kalman filter,
  - the comparison, at each moment n+1, of the difference between the state of each secondary filter and the state of the primary Kalman filter at said threshold,
  - in the presence of a difference greater than said predetermined threshold:
    - the raising of an alarm apt to signal a vulnerability of the said GNSS satellite positioning measurements at said moment n+1,
    - the reconfiguration of the primary Kalman filter on a predetermined secondary Kalman filter of index p with 1≤p≤N,
    - the deselection of the input of the primary Kalman filter dedicated to the GNSS satellite positioning measurements from the moment when the primary Kalman filter initiates the reconfiguration thereof,
    - the reconfiguration of each secondary Kalman filter of index i≠p on said predetermined secondary Kalman filter of index p,
  - in the absence of a difference greater than said predetermined threshold, the determination of a radius of protection against a vulnerability of said GNSS satellite positioning measurements, said radius of protection ensuring that the value of the distance between the hybrid position provided from said primary Kalman filter and the true position of said vehicle is less than the value of said radius of protection, said radius of protection depending on the number secondary Kalman filters.

According to a particular aspect of said method, said location step comprises the provision at output, in parallel, of navigation solutions associated with said bank of N secondary Kalman filters and with said primary Kalman filter, respectively.

A further subject matter of the invention is a computer program including software instructions which, when executed by a computer, implement such a satellite navigation and positioning method as defined hereinabove.

BRIEF DESCRIPTION OF THE DRAWINGS

Such features and advantages of the invention will become clearer upon reading the following description, given only as a non-limiting example, and made with reference to the enclosed drawings, wherein.

DETAILED DESCRIPTION OF EMBODIMENTS

Figure 1:
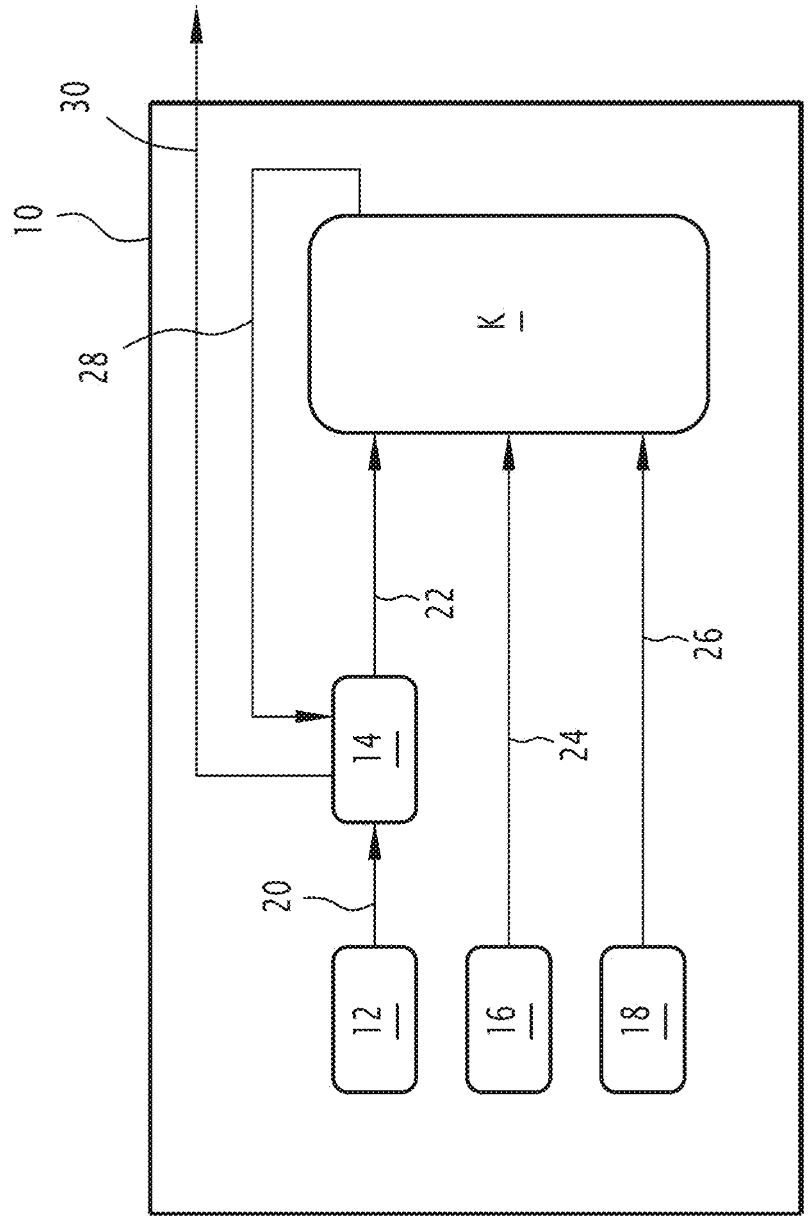
FIG. 1 is a diagram illustrating a navigation and positioning device suitable for implementing an INS/GNSS hybridization, and optionally with supplementary measurements provided by equipment distinct from a receiver of GNSS satellite positioning measurements and distinct from said inertial measurement unit.

FIG. 1 is an overall representation of a navigation and positioning device 10 according to the present invention, suitable for implementing an INS/GNSS hybridization, and optionally with supplementary measurements provided by equipment distinct from a receiver of GNSS satellite positioning measurements and distinct from said inertial measurement unit, and comprising at least one inertial measurement unit 12 suitable for providing navigation measurements, in particular to a virtual computation and location platform 14, a receiver 16 of GNSS satellite positioning measurements provided, and optionally a receiver 18 of supplementary measurements provided by at least one equipment item distinct from said receiver 16 of GNSS satellite positioning measurements and distinct from said inertial measurement unit 12 and finally a set K of Kalman filters.

The inertial measurement unit 12 consists of a set of inertial sensors such as gyrometers and accelerometers associated with electronic processing components and is suitable for providing increments 20 of angular rotation and speed of the vehicle wherein the navigation and positioning device 10 is carried on-board.

The virtual computation platform 14 integrates such increments 20 of angular rotation and of speed in order to provide, at the input of the primary Kalman filter, navigation data 22, such as the orientation of the vehicle (i.e. the attitude thereof), in terms of roll, pitch, yaw, heading, etc., the speed of the vehicle, e.g. the speed Vnorth along the North direction, the speed Veast along the East direction, the speed Vlow at the lower part of the trajectory, etc., and the position of the vehicle e.g. in terms of latitude, longitude, altitude.

The receiver 16 of GNSS positioning measurements is suitable for providing, along the direction of the arrow 24, information on the position and speed of the vehicle by triangulation from signals transmitted by moving satellites visible from the vehicle. The information provided may be temporarily unavailable because, in order to be able to establish a point, the receiver has to have direct view on a minimum of four satellites of the positioning system. Furthermore, the information has variable accuracy, depending on the geometry of the constellation at the base of the triangulation, and noisy because same rely on the reception of very low level signals coming from distant satellites having a low transmission power. However, the information is not affected by long-term drift, the positions of satellites passing through the orbits thereof being known precisely over the long term. Noise and errors may be related to satellite systems, to the receiver, or to the propagation of the signal between the satellite transmitter and the GNSS signals receiver. Furthermore, satellite data may be erroneous due to satellite failures. Such affected data must then be identified so as not to distort the position coming from the GNSS receiver.

The optional receiver 18 of supplementary measurements 26 provided by at least one item of equipment distinct from said receiver 16 of GNSS satellite positioning measurements and distinct from said inertial measurement unit 12 provides e.g. a zero displacement registration when the vehicle is stationary, an Electromagnetic Loch measurement and a dynamic model of the vehicle, a Doppler loch or a measurement of velocity in water when the equipment is a DVL (Doppler Velocity Log), a measurement of depth, a registration by radar, by imaging, by signals of opportunity, etc.

The hybridization implemented by the set of Kalman filters consists in mathematically combining the measurements 22, 24, 26 provided by the inertial measurement unit 12, the receiver 16 of GNSS positioning measurements, and the optional receiver 18 of supplementary measurements 26, respectively, in order to obtain position and speed information by taking advantage of the three elements 12, 16 and 18.

Kalman filtering is based on the possibilities of modeling the evolution of the state of a physical system considered in the environment thereof, by means of a so-called "evolution" equation (a priori estimation), and of modeling the relation of dependence existing between the states of the physical system considered and the measurements of an external sensor, by means of a so-called "observation" equation for a registration of the states of the filter (a posteriori estimation). In a Kalman filter, the effective measurement or "measurement vector" makes it possible to produce an a posteriori estimate of the state of the system which is optimal in the sense that the estimate minimizes the covariance of the error made on the estimate. The estimator part of the filter generates a posteriori estimates of the state vector of the system by using the difference found between the effective measurement vector and the a priori prediction thereof, to generate a corrective term, called innovation. The innovation, after a multiplication by a gain vector of the Kalman filter, is applied to the a priori estimate of the state vector of the system and leads to the obtaining of the a posteriori optimum estimate.

The Kalman filtering implemented by the set K of Kalman filters models the evolution of the errors of the inertial measurement unit 12 and delivers the a posteriori estimate of the errors which is used to correct the positioning and speed point of the inertial measurement unit 12.

The correction 28 of the errors by means of the estimation thereof made by the set K of Kalman filters is then carried out at the input of the virtual platform 14 according to a so-called "closed-loop" architecture as illustrated by FIG. 1 making it possible to keep navigation errors low and thus to stay in the linear domain of the set K of Kalman filters. The virtual platform 14 uses such a correction 28 to develop the optimal estimate 30 of the position and speed of the vehicle.

The hybridization is called "loose" (or geographic axis hybridization) when the receiver 16 of GNSS positioning measurements provides the position and the speed of the vehicle resolved by the GNSS receiver.

Hybridization is called "tight" when the receiver 16 of GNSS positioning measurements supplies the information extracted upstream by the GNSS receiver, namely pseudo-distances and pseudo-speeds (quantities directly derived from the measurement of the propagation time and from the Doppler effect of the signals transmitted by the satellites toward the receiver).

With such a navigation and positioning device 10 by closed-loop INS/VEH/GNSS hybridization where the point solved by the GNSS receiver 16 is used to readjust the information coming from the inertial measurement unit 12, it is necessary to monitor the defects affecting the information provided by the satellites because the receiver 16 which receives same will propagate the defects to the inertial measurement unit 12, leading to a wrong registration of the latter.

Figure 2:
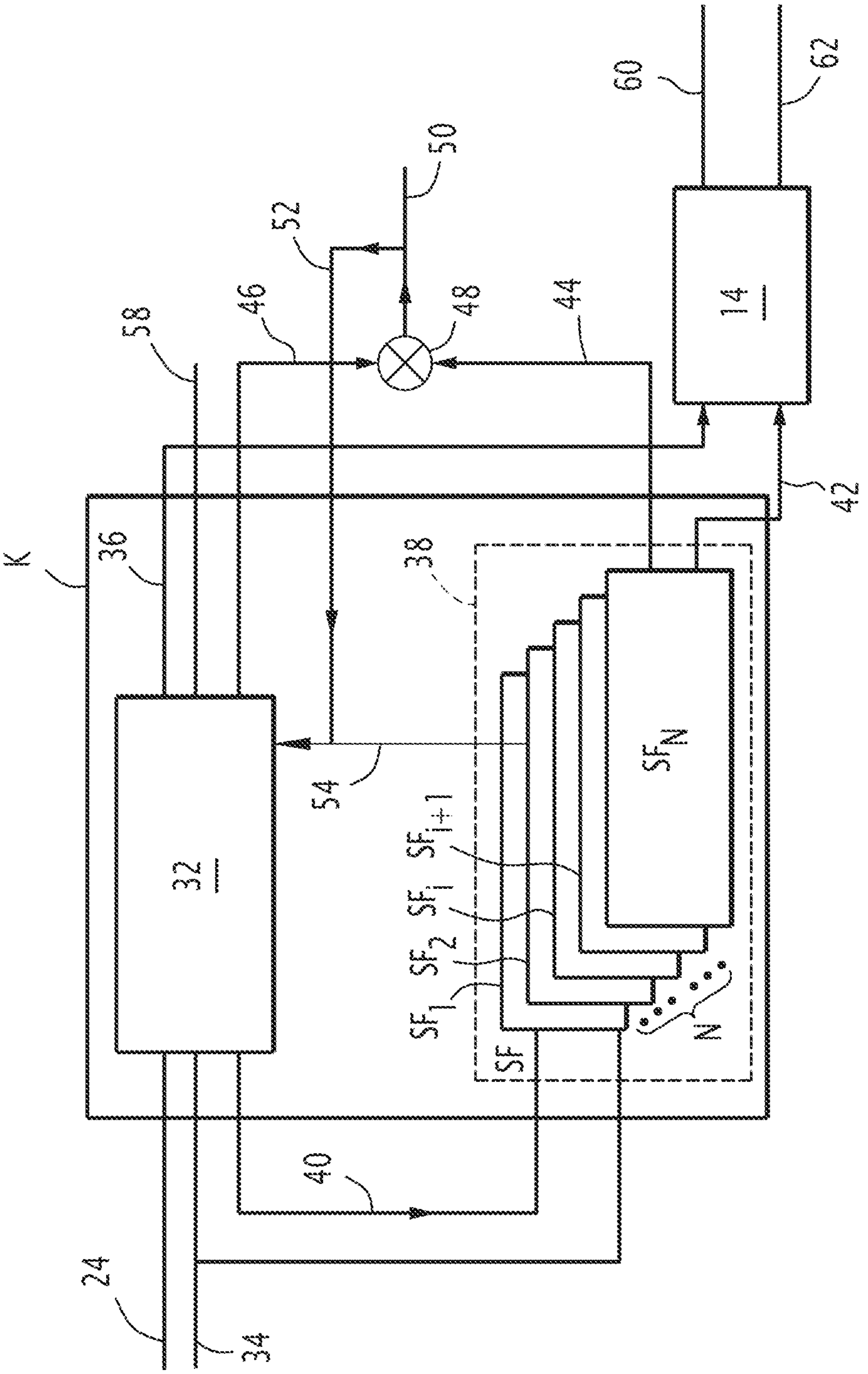
FIG. 2 is a diagram illustrating the architecture of the bank of Kalman filters according to the present invention.

To this end, the set K of Kalman filters according to the present invention has a particular architecture illustrated in FIG. 2.

The set K comprises firstly a primary Kalman filter 32 in closed-loop configured to implement a hybridization of the satellite positioning data provided by said receiver and non-satellite positioning data provided at least by said inertial measurement unit, in other words a hybridization of position measurements received at input and obtained from said GNSS satellite positioning measurements 24, and from the measurements 34 provided both by said inertial measurement unit 12 and by said optional receiver 18 of complementary measurements, respectively, in order to compute corrections 36 of navigation data.

The set K further comprises, according to the present invention, a bank 38 of N secondary Kalman filters $SF_1$, $SF_2$, . . . $SF_i$, $SF_{i+1}$, . . . $SF_N$, operating at differences (i.e. the correction established by the 32 primary filter being applied, as shown in detail thereafter, to the propagation phase of each secondary Kalman filter) with N a predetermined integer such that N≥1, or even preferentially N>1, each secondary index Kalman filter of index i, with 1≤i≤N, being apt to reconfigure itself (i.e. to copy the state vector and the covariance matrix of the primary Kalman filter 32), according to the arrow 40 on the primary Kalman filter at a moment $(i-1)^T$ from the beginning of the navigation of the vehicle, and then periodically according to a period N×T, with T a predetermined duration.

For example, if T=2 hours and N=12, the first secondary Kalman filter (i.e. sub-filter) $SF_{1(i=1)}$ is reconfigured on the primary Kalman filter 32 at the start of navigation and then 2×12=24 hours after the start of navigation and so on. The second secondary Kalman filter $SF_{2(i=2)}$ is reconfigured two hours after the start of navigation and then 2×12+2=26 hours after the start of navigation and so on.

Moreover, each secondary Kalman filter $SF_1$, $SF_2$, . . . $SF_i$, $SF_{i+1}$, . . . $SF_N$ is configured to compute corrections 42 of navigation data solely from the non-satellite positioning data provided at least by said inertial measurement unit, in particular herein by hybridization of position measurements received at input and obtained only from measurements 34 provided by said inertial measurement unit 12 and provided by said optional receiver 18 of supplementary measurements, and does not accept at input, unlike the primary Kalman filter 32, the GNSS satellite positioning measurements 24.

According to a more basic embodiment (not shown), each secondary Kalman filter $SF_1$, $SF_2$, . . . $SF_i$, $SF_{i+1}$, . . . $SF_N$ is configured to compute corrections 42 of navigation data, solely from the non-satellite positioning data provided by said inertial measurement unit, dispensing with the non-satellite data provided by the optional receiver 18.

According to an optional variant, the N secondary Kalman filters $SF_1$, $SF_2$, . . . $SF_i$, $SF_{i+1}$, . . . $SF_N$ are identical and independent, the period N×T corresponding to a verification period of the integrity of said GNSS satellite positioning measurements 24.

According to a particular variant of the present invention, the device 10, part of which is shown in FIG. 2, is also configured to check, at each moment n+1, the integrity of said GNSS satellite positioning measurements by comparing, with a predetermined threshold, the difference between the state 44 of each secondary filter $SF_1$, $SF_2$, . . . $SF_i$, $SF_{i+1}$, . . . $SF_N$ and the state 46 of the primary Kalman filter 32. The element 48 of FIG. 2 determines such a difference and compares same with a predetermined threshold 50.

In case of difference greater than said predetermined threshold 50, the device 10 is configured to raise, along the arrow 52 of FIG. 2, an alarm suitable for signaling a vulnerability of said GNSS satellite positioning measurements at said moment n+1.

Figure 4:
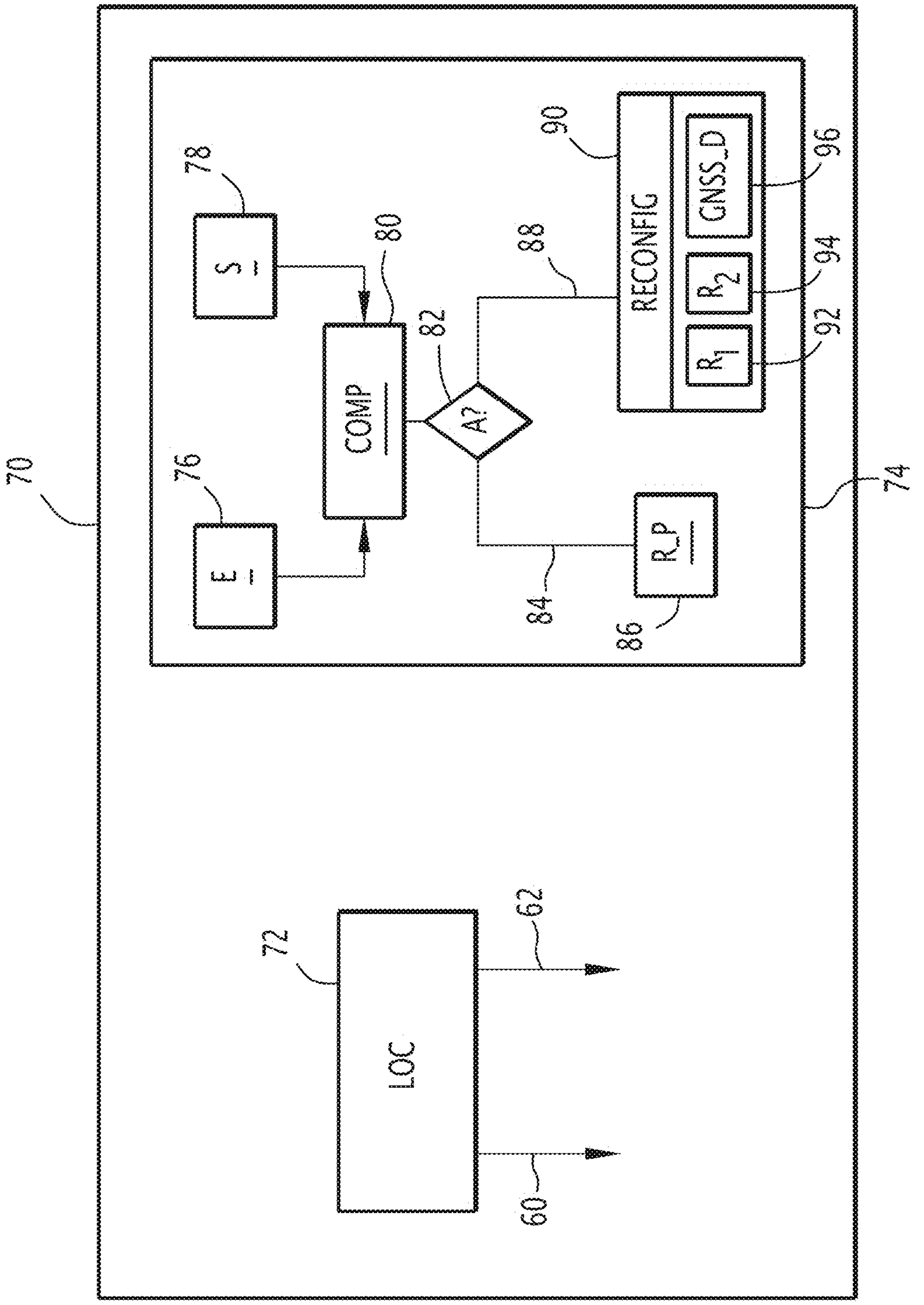
FIG. 4 is a diagram illustrating the architecture of the navigation and positioning device according to the present invention.

As an optional addition, the device 10 is also configured, by means of a computation tool not shown in FIG. 2, to determine said predetermined threshold 50 as a function of a probability of false alarm, as discussed in detail below in relation to FIG. 4.

As an optional addition, as illustrated by the embodiment represented by FIG. 2, in the case of raise of alarm illustrated by the arrow 52, the primary Kalman filter 32 is also configured to reconfigure itself, along the arrow 54, on a predetermined secondary Kalman filter $SF_p$ of index 1≤p≤N with p. "Reconfigure itself" means that the primary Kalman filter 32 is suitable for copying the state vector and the covariance matrix of the secondary Kalman filter $SF_p$.

According to a supplementary variant of the optional addition, said predetermined secondary Kalman filter $SF_p$ of index p on which the primary Kalman filter 32 is apt to reconfigure itself, along the arrow 54, in case of raising 52 of alarm, is the secondary Kalman filter among said N secondary Kalman filters the reconfiguration 40 of which on the primary Kalman filter 32 is the farthest, in terms of time, from the moment n+1 of raise of alarm.

According to another supplementary variant of the optional addition, said primary Kalman filter 32 is configured to no longer use said GNSS satellite positioning measurements 24 as input from the moment when the primary Kalman filter 32 initiates the reconfiguration thereof. In other words, as soon as the reconfiguration of the primary Kalman filter 32 is ordered, the positioning measurements 24 by GNSS satellites (the vulnerability of which is detected) are no longer used e.g. by sending a deselection command for the measurements at the input of the set K of Kalman filters.

According to another supplementary variant of the optional addition, in case of raising of alarm 52, each secondary Kalman filter of index i≠p is also configured to reconfigure itself on said predetermined secondary Kalman filter of index p, which makes it possible to restore a completely healthy set K of primary Kalman filters 32 and secondary Kalman filters $SF_1$, $SF_2$, . . . $SF_i$, $SF_{i+1}$, . . . $SF_N$.

According to another optional supplementary aspect, the device 10 is also configured to determine a radius of protection 58 against a vulnerability of said GNSS satellite positioning measurements, said radius of protection ensuring that the value of the distance between the hybrid position 30 provided from said primary Kalman filter 32 and the true position of said vehicle is less than the value of said radius of protection 58, said radius of protection 58 depending on the number N of secondary Kalman filters.

Indeed, in order to quantify the integrity of a position measurement in applications such as naval or aeronautical applications, where integrity is critical, such a radius of protection parameter for the position measurement is generally used. The radius of protection generally corresponds to a maximum position error for a given probability of error occurrence, i.e. the probability that the position error exceeds the announced radius of protection without an alarm being sent to a navigation system, is less than the given probability value. The computation is based on two types of error which are, on the one hand, normal measurement errors and, on the other hand, errors caused by an anomaly in the operation of the constellation of satellites, meaning e.g. a failure of a satellite. The value of the radius of protection of a positioning system is a key value specified by contractors wishing to acquire a positioning system. The evaluation of the value of the radius of protection generally results from probability computations using the statistical characteristics of precision of GNSS measurements and of the behavior of inertial sensors. Such computations are explained formally and allow simulations for all GNSS constellation cases, for all possible positions of the positioning system on the terrestrial globe and for all possible trajectories followed by the positioning system. The results of these simulations make it possible to provide the ordering party with radius of protection characteristics guaranteed by the proposed positioning system. Most often, such characteristics are expressed in the form of a value of the radius of protection for an availability of 100% or of an unavailability time for a required value of the radius of protection.

The determination of the radius of protection implemented according to the present invention using the particular architecture of the set K of Kalman filters is described hereinafter in more detail in relation to FIG. 4.

According to another optional supplementary aspect, the device 10 is also configured to provide, at the output, in parallel, navigation solutions 60 and 62 associated with said primary Kalman filter and with said bank SF of N secondary Kalman filters, respectively.

In other words, the device 10 according to the present invention makes possible a parallel navigation by distinct Kalman filters, namely via the navigation solutions 62 associated with the N secondary Kalman filters $SF_1$, $SF_2$, . . . $SF_i$, $SF_{i+1}$, . . . $SF_N$ and via the navigation solutions 60 correspondingly associated with the primary Kalman filter 32. Such an architecture thereby provides secondary navigation solutions, in terms of position, speed, attitude, in parallel with the solution provided by the primary filter, such secondary navigation solutions being suitable for being useful for certain types of navigation, in particular underwater navigation.

For example, for the position, at each cycle of the primary Kalman filter 32, the device 10 according to the present invention is apt to apply the correction $Cor^{SF}$ of each secondary Kalman filter (i.e. sub-filter) $SF_1$, $SF_2$, . . . $SF_i$, $SF_{i+1}$, . . . $SF_N$ to the primary position state $X_{n+1/n}$ (i.e. associated with the primary solution INS/GNSS delivered by the primary Kalman filter 32, n and n+1 being successive times) to obtain the position state $$X^{SF}_{n+1/n}$$

associated with the sub-filter SF:

$$Cor^{SF}_{n+1} = X^{SF}_{n+1/n} - Cor_{n+1} = X^{SF}_{n+1/n} - X_{n+1/n},$$

and the same for latitude $Lat^{SF}$, longitude LonSF, and altitude $Alt^{SF}$, such as:

$$\mathrm{Lat}^{SF} = \mathrm{Lat}^{INS/GNSS} + Cor^{SF}(\mathrm{Lat}),\ Lon^{SF} = Lon^{INS/GNSS} + Cor^{SF}(Lon)$$
$$Alt^{SF} = Alt^{INS/GNSS} + Cor^{SF}(Alt)$$

According to a variant (not shown), the navigation and positioning device 10 according to the present invention comprises a processing unit consisting e.g. of a memory and a processor associated with the memory, and the device 10 is at least in part made in the form of software, or of a software brick, executable by the processor, in particular the set K of Kalman filters, the virtual computation and location platform 14, the element 48 of FIG. 2 configured to determine a difference between the state of each secondary filter and the primary Kalman filter, and compare the difference with the predetermined threshold 50 and optionally the computation tool configured to determine the threshold 50. The memory of the navigation and positioning device 10 is then apt to store such software or software bricks, and the processor is then apt to execute same.

In a variant (not shown), the set K of Kalman filters, the virtual computation and location platform 14, the element 48 of FIG. 2 configured to determine a difference between the state of each secondary filter and the state of the primary Kalman filter, and to compare the difference with a predetermined threshold 50, and optionally the computation tool configured to determine said threshold 50 are each implemented in the form of a programmable logic component, such as an FPGA (Field Programmable Gate Array), or else in the form of a dedicated integrated circuit, such as an ASIC (Application Specific Integrated Circuit).

When at least a part of the navigation and positioning device 10 to the invention is produced in the form of one or a plurality of software programs, i.e. in the form of a computer program, such part is further apt to be stored on a computer-readable medium (not shown). The computer-readable medium is e.g. a medium apt to store the electronic instructions and to be coupled to a bus of a computer system. As an example, the readable medium is an optical disk, a magneto-optical disk, a ROM memory, a RAM memory, any type of non-volatile memory (e.g. EPROM, EEPROM, FLASH, NVRAM), a magnetic card or further an optical card. A computer program containing software instructions is then stored on the readable medium.

Figure 3:
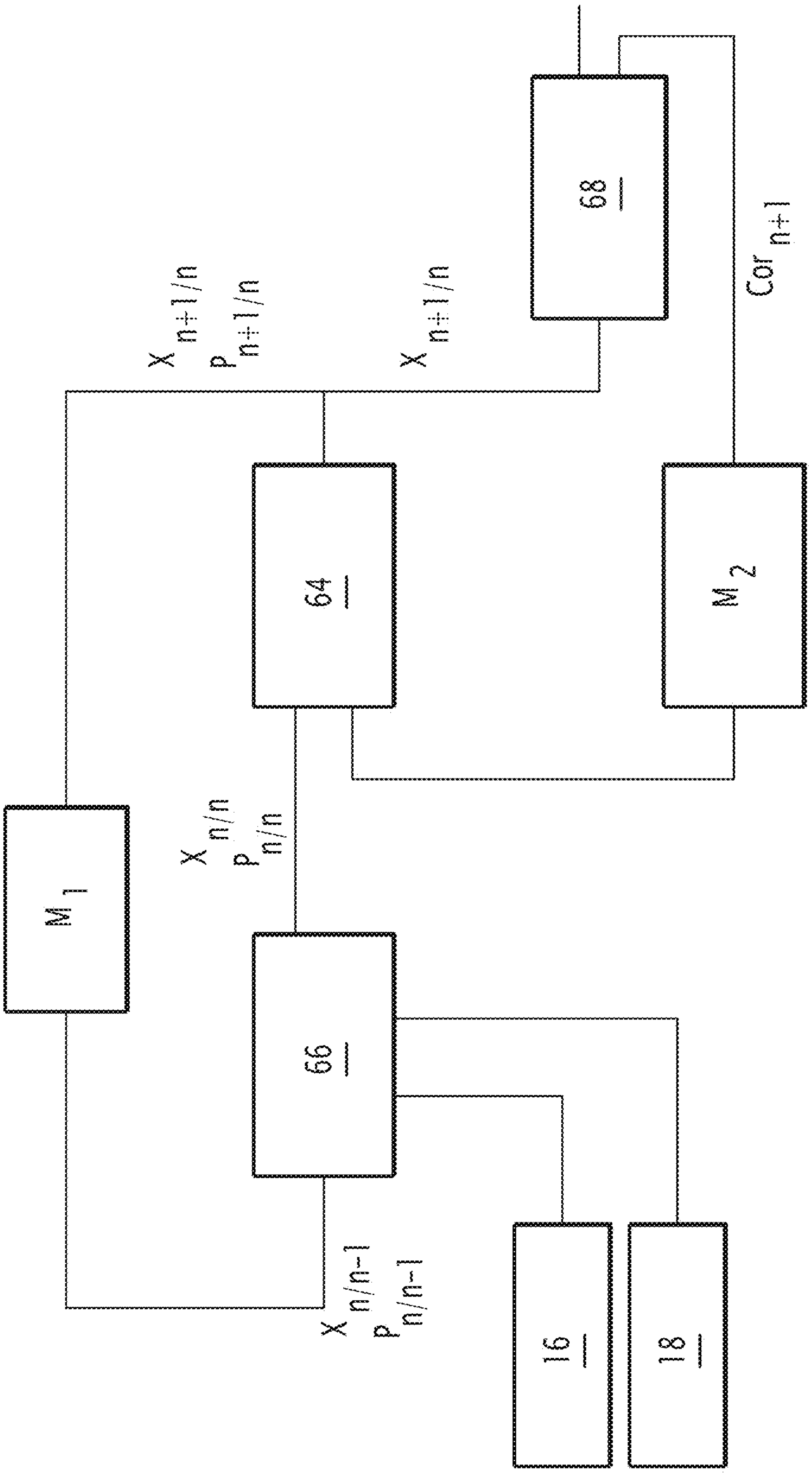
FIG. 3 illustrates the closed-loop principle.

FIG. 3 illustrates the closed-loop principle applied to the primary Kalman filter K, with the position state X of the primary Kalman filter 32, and P the covariance matrix thereof. A propagation module 64 of the primary Kalman filter 32 is configured to propagate the state using the navigation equations, and a registration module 66 is used to estimate the state using the GNSS measurements provided by said receiver 16 of GNSS satellite positioning measurements and the measurements of the optional receiver 18 of supplementary measurements provided by at least one equipment item distinct from said receiver 16 of GNSS satellite positioning measurements and distinct from said inertial measurement unit 12. The propagation and closed-loop registration equations are for the registration, implemented by the module 66:

$$K_n = P_{n/n-1}.H^T\left(R_n + H.P_{n/n-1}.H^T\right)^{-1}$$
$$X_{n/n} = X_{n/n-1} + K_n.(Z_n - H.X_{n/n-1})$$
$$P_{n/n} = (I - K_n.H)P_{n/n-1}$$

and for the propagation implemented by the module 64:

$$P_{n+1/n} = F_{n+1}.P_{n/n}.F^T_{n+1} + Q_{n+1}$$
$$X_{n+1/n} = F_{n+1}.X_{n/n} - Cor_n$$
$$Cor_{n+1} = X_{n+1/n}$$

with F the propagation matrix, Q the model noise matrix, R the measurement noise covariance matrix, H the observation matrix, K the Kalman gain and Z the observation vector obtained from the receiver 16 and from 18, $X_{n+1/n}$ the position state vector propagated after propagation between the two successive times n and n+1. The correction $Cor_{n+1}$ is applied by a correction module 68 to the navigation data to obtain the position state $X_{n+1/n+1}$ and stored in the memory $M_2$, as well as the covariance matrix $P_{n+1/n}$ in the memory $M_1$, for a subsequent iteration at the moment n+1.

The principle also applies to each secondary Kalman filter (i.e. sub-filter) $SF_1$, $SF_2$, . . . $SF_i$, $SF_{i+1}$, . . . $SF_N$ each sub-filter $SF_1$, $SF_2$, . . . $SF_i$, $SF_{i+1}$, . . . $SF_N$ using the observation matrix H, the measurement noise R and the measurements Z of the observations coming from the receiver 18 of supplementary measurements provided by at least one item of equipment distinct from said receiver 16, of GNSS satellite positioning measurements and distinct from said inertial measurement unit 12, a set K of Kalman filters, but in no case the measurements coming from the receiver 16 of GNSS satellite positioning measurements.

More precisely, for each secondary Kalman filter (i.e. sub-filter) $SF_1$, $SF_2$, . . . $SF_i$, $SF_{i+1}$, . . . $SF_N$, conventional Kalman filter equations are used by applying the INS/GNSS correction Cor of the primary Kalman filter 32 at the moment of propagation.

The propagation and registration equations are thus implemented for the registration within each secondary Kalman filter operating at differences (i.e. the correction established by the primary filter being applied, as discussed in detail below, to the propagation phase of each secondary Kalman filter):

$$K^{SF} = P^{SF}_{n/n-1}.H^{SF^T}\left(R + H^{SF}.P^{SF}_{n/n-1}.H^{SF^T}\right)^{-1}$$

$$X^{SF}_{n/n} = X^{SF}_{n/n-1} + K^{SF}.(Z^{SF} - H^{SF}.X^{SF}_{n/n-1})$$

$$P^{SF}_{n/n} = (I - K^{SF}.H^{SF})P^{SF}_{n/n-1}$$

and for the propagation:

$$P^{SF}_{n+1/n} = F.P^{SF}_{n/n}.F^T + Q$$

$$X^{SF}_{n+1/n} = F.X^{SF}_{n/n} - Cor_n$$

with $Cor_n$ the correction coming from the primary Kalman filter 32, $Z^{SF}$ the observation vector which is a subset of Z from the primary Kalman filter 32 containing only the observations obtained from the receiver 18, and not from the receiver 16 of GNSS satellite positioning measurements, $H^{SF}$ the observation matrix which contains the lines of H of the primary Kalman filter 32 linked to the observations of the secondary filter considered in turn (i.e. in other words $H^{SF}$ contains zeros for the part associated with the GNSS satellite positioning measurements), $K^{SF}$ the secondary filter considered for the covariance matrix of the Kalman filter for the secondary filter considered.

An example of the operation of the navigation and positioning device 10 according to the present invention will now be described hereinafter with reference to FIG. 4.

More precisely, the navigation and positioning method 70 implemented by said navigation and positioning device 10 comprises the steps described hereinafter, implemented in parallel or successively one after the other or vice versa.

According to step 72, as indicated hereinabove, the navigation and positioning device 10 according to the present invention implements a location n of said vehicle by using the corrections provided by the primary Kalman filter and by the bank of N secondary Kalman filters, respectively.

According to an optional aspect, such a location is suitable for enabling parallel navigation by distinct Kalman filters, namely via the navigation solutions 60 associated with the N secondary Kalman filters $SF_1$, $SF_2$, . . . $SF_i$, $SF_{i+1}$, . . . $SF_N$ and via the navigation solutions 62 correspondingly associated with the primary Kalman filter 32.

In parallel with step 72, or successively with step 72 or vice versa (i.e. before the step 72), a step 74 for verifying the integrity of said GNSS satellite positioning measurements is implemented by the navigation and positioning device 10 according to the present invention.

According to a particular embodiment illustrated in FIG. 2, said verification 74 comprises in particular a sub-step 76 of determining the state of each secondary filter and of the state of the primary Kalman filter, between two successive times n and n+1, and of the difference E between the state of each secondary filter and the state of the primary Kalman filter.

Optionally, said verification step 74 also comprises a sub-step 78 of determining a threshold S suitable for being compared with the difference E between the state of each secondary filter and the state of the primary Kalman filter.

As an alternative (not shown), to the sub-step 78 of determining a threshold S, said threshold S is directly provided and determined outside of said navigation and positioning device 10.

During step 80, the navigation and positioning device 10 according to the present invention then implements the comparison, at each moment n+1, of the difference E, between the state of each secondary filter $SF_1$, $SF_2$, . . . $SF_i$, $SF_{i+1}$, . . . $SF_N$ and the state of the primary Kalman filter 32, at said threshold S.

During a step 82, the raising of an alarm A is either triggered or not triggered.

More precisely, in the absence of a difference greater than said predetermined threshold S, said absence being represented by the branch 84, no alarm is raised, and during a sub-step 86, the navigation and positioning device 10 then implements the determination R_P of a radius of protection against a vulnerability of said GNSS satellite positioning measurements, said radius of protection ensuring that the value of the distance between the hybrid position provided from said primary Kalman filter 32 and the true position of said vehicle is less than the value of said radius of protection, said radius of protection depending on the number of secondary Kalman filters.

On the other hand, in the presence of a difference greater than said predetermined threshold, said presence being represented by the branch 88, the raising of an alarm suitable for signaling a vulnerability of said GNSS satellite positioning measurements at said moment n+1 is triggered, as is a subsequent step 90 of reconfiguring the navigation and positioning device 10.

Step 90 comprises a first sub-step 92 of reconfiguration $R_1$ of the primary Kalman filter 32 on a predetermined secondary Kalman filter of index p with $1 \leq p \leq N$, a second sub-step 94 of reconfiguration $R_2$ of each secondary Kalman filter of index $i \neq p$ on said predetermined secondary Kalman filter of index p, a third sub-step 96 of GNSS_D deselection of the input of the primary Kalman filter dedicated to GNSS satellite positioning measurements from the moment when the primary Kalman filter initiates the reconfiguration thereof.

Steps of said method 70 according to the present invention are described in greater detail hereinafter.

More particularly, during the sub-step 76, the difference $$E = V_X = X^{SF}_{n+1/n} - X_{n+1/n}$$

between the state of each secondary filter and the state of the primary Kalman filter is determined because if a GNSS measurement is erroneous, same will corrupt the primary INS/GNSS solution coming from the primary Kalman filter 32, but not certain solutions coming from the sub-solutions provided by the N secondary filters suitable for performing a time-shifted registration according to the present invention. Such a difference between the different solutions correspondingly associated with the different filters of the Kalman filter set K will result in a difference between the position states of the sub-filter $$X_{n+1/n}^{SF}$$

and of the primary filter $X_{n+1/n}$ that has a variable importance depending on the state studied, and inconsistent with the covariance of the difference of the states, the position states X in question corresponding e.g. to states of heading, speed, position, etc.

During the sub-step 80, one seeks to check, over time and for each sub-filter, the difference $$E = V_X = X_{n+1/n}^{SF} - X_{n+1/n}$$

by comparing same, via a predetermined threshold, with the covariance of the difference of the states.

Indeed, considering that the observation matrices of each sub-filter $H^{SF}$ and of measurement noise $R^{SF}$ are sub-matrices of the observation matrices H and measurement noise matrices R of the main Kalman filter 32 where the rows (columns respectively) related to the GNSS measurements have been set to zero (the rest being identical between the sub-filter and the main filter), and that the propagation F and model noise Q matrices are identical between the sub-filter and the main filter, then it is demonstrable by recurrence, by a person skilled in the art, that the expectancy $(X \cdot X^{SF^T})$ is equal to the difference of covariance matrix $P^{SF}-P$, which, by development, is equivalent to an expectancy of $((X-X^{SF}X)(X-X^{SF})^T)$ equal to P the covariance matrix of the main Kalman filter 32.

According to an optional supplementary aspect, as described hereinabove, the navigation and positioning device 10 according to the present invention determines as such, during step 78, said threshold used to compare the difference $$E = V_X = X_{n+1/n}^{SF} - X_{n+1/n}$$

with the covariance of the difference of the states.

More particularly, during the sub-step 78, according to a probability of false alarm noted by $P_{fa}$, one seeks to establish a real threshold value such as:

$$V_X = X_{n+1/n}^{SF} - X_{n+1/n} = K_{fa} \cdot \sqrt{E\left(\left(X_{n+1/n} - X_{n+1/n}^{SF}\right)\left(X_{n+1/n} - X_{n+1/n}^{SF}\right)^T\right)} = K_{fa} \cdot \sqrt{\left(P_{n+1/n}^{SF} - P_{n+1/n}\right)}$$

$P_{n+1/n}^{SF}$ and $P_{n+1/n}$ being provided by the secondary Kalman filter considered and by the primary Kalman filter, respectively, the secondary Kalman filter containing less information than the primary Kalman filter 32, then by construction $$P_{n+1/n}^{SF} \geq P_{n+1/n}.$$

Furthermore, the difference $$X_{n+1/n}^{SF} - X_{n+1/n}$$

also follows, by the construction of the Kalman filters, a centered Gaussian law with standard deviation $\sqrt{P^{SF}-P}$. Considering e.g. a distribution of a Gaussian law centered on zero and with a standard deviation equal to one. The detection threshold is chosen for the example so that 1% of the time, an error is detected that is not present ($P_{fa}$=0.01), which leads in the example to $K_{fa}$=1,96, which means mathematically, for a variable X centered and of standard deviation equal to one, that:

$$\int_{-K_{fa}}^{K_{fa}} \frac{1}{\sqrt{2\pi}} e^{-X^2} dX \geq 1 - P_{fa},$$

and thus a threshold S such that:

$$S = K_{fa} \cdot \sqrt{\left(P_{n+1/n}^{SF} - P_{n+1/n}\right)}.$$

Thereby, as illustrated by the test sub-step 82, when $$V_X < S = K_{fa} \cdot \sqrt{\left(P_{n+1/n}^{SF} - P_{n+1/n}\right)},$$

according to branch 84, no alarm is raised because there is then no problem detected on the GNSS measurements.

On the other hand, according to branch 88, when $$V_X \geq S = K_{fa} \cdot \sqrt{\left(P_{n+1/n}^{SF} - P_{n+1/n}\right)},$$

an anomaly on GNSS measurements is detected and an alarm is raised.

It should be noted that the test 82 is performed, depending on the application, on certain controlled states such as position, speed, attitudes, sensor fault states, etc., for the N sub-filters of the architecture.

As indicated hereinabove, in the absence 84 of a difference greater than said predetermined threshold S, no alarm is raised, and during a sub-step 86, the navigation and positioning device 10 then implements the determination of a radius of protection against a vulnerability of said GNSS satellite positioning measurements, said radius of protection ensuring that the value of the distance between the hybrid position provided from said primary Kalman filter 32 and the true position of said vehicle is less than the value of said radius of protection, said radius of protection depending on the number of secondary Kalman filters.

To determine such a radius of protection, which is entirely predictive, from the covariances of the primary Kalman filter 32 and of the Kalman sub-filters $SF_1$, $SF_2$, . . . $SF_i$, $SF_{i+1}$, . . . $SF_N$, the navigation and positioning device 10 adds in a probability of non-detection $P_{nd}$.

In particular, taking as an example the latitude state noted by $X_{lat}$, the radius of protection $R_p$ is then defined as follows:

$$P\left(\sum_N\left(V_{X_{lat}} < K_{fa}\cdot\sqrt{(P_{lat}^{SF}-P_{lat})}\right)\cap|X_{lat}-lat_{true}|>R_p\right)<P_{nd}$$

with $\Sigma_N$ the sum over the N secondary Kalman filters, $P_{lat}$ the diagonal of the covariance matrix corresponding to the latitude state $X_{lat}$.

Considering the simplest case where N=1, which means using a single secondary Kalman filter, $|X_{lat}-lat_{true}|$ is limited with the state of the secondary Kalman filter which potentially can detect the GNSS failure (i.e. a vulnerability of GNSS measurements):

$$|X_{lat}-lat_{true}| \le |X_{lat}-X_{lat}^{SF}| + |X_{lat}^{SF}-lat_{true}|$$

$$|X_{lat}-lat_{true}| \le V_{X_{lat}} + |X_{lat}^{SF}-lat_{true}|$$

Moreover, as seen hereinabove, at the moment of detection:

$$V_{X_{lat}} = K_{fa}\cdot\sqrt{(P_{lat}^{SF}-P_{lat})},$$

so that the whole issue of the radius of protection $R_{Plat}$ lies in the fact that at the same moment of detection:

$$|X_{lat}-lat_{true}| \le V_{X_{lat}} + |X_{lat}^{SF}-lat_{true}| \le K_{fa}\cdot\sqrt{(P_{lat}^{SF}-P_{lat})} + |X_{lat}^{SF}-lat_{true}| \le R_{P_{lat}}.$$

Then by taking $$R_{P_{lat}} = K_{fa}\cdot\sqrt{(P_{lat}^{SF}-P_{lat})} + |X_{lat}^{SF}-lat_{true}|,$$

and considering that:

$$|X_{lat}^{SF}-lat_{true}|$$

follows a centered Gaussian law of standard deviation $$\sqrt{P_{lat}^{SF}}.$$

The determination of the radius of protection means looking for the coefficient $K_{nd}$ such that:

$$\int_{-\infty}^{K_{nd}} \frac{1}{\sqrt{2\pi P_{lat}^{true}}} e^{-\frac{X_{lat}^2}{P_{lat}^{SF}}} dX \ge 1 - P_{nd},$$

so that it is then possible to guarantee that if the difference $$|X_{lat}^{SF}-lat_{true}|$$

is less than $$K_{nd}\sqrt{P_{lat}^{SF}},$$

at the time of the GNSS failure, then: $|X_{lat}-lat_{true}| \le R_{Plat}$ with a non-detection probability for the failure of $P_{nd}$ and then:

$$R_{P_{lat}} = K_{fa}\cdot\sqrt{(P_{lat}^{SF}-P_{lat})} + K_{nd}\sqrt{P_{lat}^{SF}}$$

Considering the most complex case according to which N≠1, which means using a plurality of secondary Kalman filters, making no assumption about the duration of the failure except that the failure cannot be detected during (N−1). T hours, when T is the reconfiguration period of the sub-filters, then the radius of protection preferentially corresponds to the maximum value of the protection radii of each of the sub-filters such that:

$$R_{P_{lat}} = \max_N\left(K_{fa}\cdot\sqrt{(P_{lat}^{SF}-P_{lat})} + K_{nd}\sqrt{P_{lat}^{SF}}\right)$$

as long as the detection of the fault has not raised an alarm. As soon as the alarm is raised, the radius of protection can propagate with the error value as follows:

$$R_{P_{lat}} = \max_N\left(|X_{lat}-X_{lat}^{SF}| + K_{nd}\sqrt{P_{lat}^{SF}}\right)$$

so that is then preferable to stop the reconfiguration mechanism along the arrow 40 of FIG. 2 of each secondary Kalman filter $SF_1$, $SF_2$, . . . $SF_i$, $SF_{i+1}$, . . . $SF_N$ on the primary Kalman filter 32.

It should be noted that the previous example of determination of the radius of protection developed from the latitude state can be generalized to other states such as other position (longitude, altitude) states or else to speed states or attitude states and heading states.

With regard to the reconfiguration sub-step 90, it should be noted that the architecture of the proposed Kalman filter set K has the ability to propose a navigation solution that is not corrupted by the GNSS failure. Indeed, once the alarm has been lifted, just as the secondary Kalman filters $SF_1$, $SF_2$, . . . $SF_i$, $SF_{i+1}$, . . . $SF_N$ were, prior to the raising of an alarm, reconfigured periodically and offset on the primary Kalman filter 32, it is possible to reconfigure the primary Kalman filter 32 on a non-corrupted secondary Kalman filter, the choice of which is suitable for depending on the desired application, a preferential and conservative choice being to take the secondary Kalman filter which has been reinitialized the longest time before on the primary Kalman filter 32 assuming that the GNSS failure could not be detected for more than (N−1). T hours. Thereby, during the reconfiguration, the covariance matrix of the primary Kalman filter 32 is overwritten by the matrix of the selected healthy sub-filter.

The architecture of the navigation and positioning device 10 according to the embodiment of FIGS. 1 and 2 was tested by considering the example of application considering the trajectory of a vehicle corresponding to a surface vessel at 10 m/s (19.4 kts) for 4 days, a GNSS longitude drift command after 69.4 hours (250,000 seconds) of navigation, the drift taking as value 0.25 m/s (0.46 kts), the use, within the vehicle, of a high performance INS having a typical gyrometric drift of 0.01°/h, a multi-filter architecture of the set K as described hereinabove and consisting of twelve secondary Kalman filters (sub-filters) reinitialized every 24 h with a shift of 2 h therebetween, and a probability of false alarm $P_{fa}$ taken at $10^{-5}$/hour and a probability of non-detection $P_{nd}$ taken at 0.1% for calculating the threshold S of detection and the radius of protection.

As a result, such an architecture of the navigation and positioning device 10 according to the embodiment of FIGS. 1 and 2 detects a GNSS longitude drift after 3 hours 30 minutes, i.e. a drift in position of 1.6 NM, and the determined radius of protection converges toward 6.2 NM and is much greater than the difference between the hybrid position and true position at the moment of detection.

Moreover, in the absence of a GNSS failure, the hybrid position provided by the primary Kalman filter 32 and the GNSS position provided e.g. by a GPS have less than 10 meters of error with respect to the true position, whereas the positions provided by the twelve secondary Kalman filters are within a radius of 0.5 NM around the true position in accordance with the inertial performance of the selected INS. Thereby, the positions are all contained within the radius of protection determined according to the present invention.

Furthermore, during the detection of a GNSS failure, the GPS position and the hybrid position 62 provided by the primary Kalman filter drifted by about 1.6 NM in longitude, whereas the positions 60 provided by the secondary Kalman filters $SF_1$, $SF_2$, . . . $SF_i$, $SF_{i+1}$, . . . , $SF_N$ stayed overall within a radius of 0.5 NM around the true position. Only a secondary Kalman filter was partially trained as same was reset to the primary Kalman filter after the occurrence of the drift on the GNSS longitude. Thereby, the radius of protection determined according to the present invention covers the hybrid position well.

A person skilled in the art would understand that the invention is not limited to the embodiments described, nor to the particular examples of the description, the above-mentioned embodiments and variants being suitable for being combined with one another so as to generate new embodiments of the invention.

The present invention thereby proposes an architecture of a set of Kalman filters with time-shifted registration allowing the integrity of the positioning to be maintained independently of the vulnerability of GNSS measurements by comparison

- on the one hand, of the primary position resulting from the classical ins/GNSS hybridization carried out through a primary Kalman filter 32 using as input all the available measurements: GNSS, external position, zero displacement registration when the vehicle is stationary, measurement of electromagnetic Loch and a dynamic model of the vehicle, Doppler loch or DVL, depth measurement, radar registration, imaging, opportunity signal registration, etc.
- with, on the other hand, a subset of secondary positions provided by a bank of N secondary Kalman filters not using at input any GNSS measurement for a certain period (e.g. on the order of a few hours), which means using partial measurements.

Such a check is not carried out only on a single satellite at a time, which prevents limiting the field of application.

In addition, the navigation and positioning device 10 is, according to an optional aspect, suitable for permanently proposing a set of navigation solutions, a part of which has not used or GNSS measurements for a certain time, typically from several hours to several days.

Furthermore, according to an optional variant of embodiment, the navigation and positioning device 10 is also suitable for providing a radius of protection against a vulnerability of the GNSS measurements and apt to initiate a reconfiguration of the primary Kalman filter on a solution of a healthy secondary Kalman filter if a vulnerability of the GNSS measurements is detected. Thereby, a healthy fall-back solution is always available if a problem is detected on the GNSS signals.

In other words, the present invention makes it possible to maintain the integrity of the location, to warn when the GNSS signals are not reliable, to reconfigure itself on a solution not tainted by the vulnerability of the GNSS measurements, in other words, to reconfigure the primary Kalman filter on a "healthy" secondary Kalman filter, and to have available a panel of navigation solutions deduced from secondary Kalman filters that have navigated without the GNSS measurement since a variable time.

The invention claimed is:

1. A navigation and positioning device carried on-board a vehicle moving between two distinct geographical positions, the device comprising:

- an inertial measurement unit providing navigation measurements;
- a receiver of GNSS satellite positioning measurements;
- a closed-loop primary Kalman filter computing navigation data corrections by hybridizing satellite positioning data provided by said receiver and non-satellite positioning data provided by at least said inertial measurement unit;
- a bank of N identical and independent secondary Kalman filters in closed-loop with N a predetermined integer such that N≥1, each secondary Kalman filter computing navigation data corrections solely from the non-satellite positioning data provided by at least said inertial measurement unit, each secondary Kalman filter of index i, where 1≤i≤N, being able to reconfigure itself on said primary Kalman filter at a time (i−1) T from the start of navigation of the vehicle, and then periodically at a period N×T, T being a predetermined duration, the period N×T corresponding to a verification period of the integrity of the GNSS satellite positioning measurements; and
- a processor configured to:
- check, at each moment n+1, the integrity of the GNSS satellite positioning measurements by comparing, at a predetermined threshold, the difference between the state of each secondary filter and the state of said primary Kalman filte, and
- in case of difference greater than the predetermined threshold, raise an alarm suitable for signaling a vulnerability of the GNSS satellite positioning measurements at the moment n+1.

2. The device according to claim 1, wherein said processor determines the predetermined threshold based on a predetermined probability of false alarm.

3. The device according to claim 1, wherein, in the event said processor raises an alarm, said primary Kalman filter reconfigures itself on a predetermined secondary Kalman filter of index p with $1 \leq p \leq N$.

4. The device according to claim 3, wherein the predetermined secondary Kalman filter of index p on which said primary Kalman filter is suitable for being reconfigured in the event said processor raises an alarm, is the secondary Kalman filter among said N secondary Kalman filters the reconfiguration of which on said primary Kalman filter is the farthest, in terms of time, from the moment of raising of alarm.

5. The device according to claim 3, wherein said primary Kalman filter is configured to no longer input the GNSS satellite positioning measurements from the moment when said primary Kalman filter initiates the reconfiguration thereof.

6. The device according to claim 3, wherein in the event said processor raises an alarm, each secondary Kalman filter of index $i \neq p$ reconfigures itself to the predetermined secondary Kalman filter of index p.

7. The device according to claim 1, wherein said processor determines a radius of protection against a vulnerability of the GNSS satellite positioning measurements, the radius of protection ensuring that the value of the distance between the hybrid position provided from said primary Kalman filter and the true position of the vehicle is less than the value of the radius of protection, the radius of protection depending on the number N of secondary Kalman filters.

8. The device according to claim 1, wherein said processor provides, in parallel at the output, navigation solutions associated with said bank of N secondary Kalman filters and said primary Kalman filter, respectively.

* * * * *